United States Patent
Cuan et al.

(10) Patent No.: US 11,775,987 B2
(45) Date of Patent: *Oct. 3, 2023

(54) SYSTEM FOR MANAGING FRAUDULENT COMPUTING OPERATIONS OF USERS PERFORMED IN COMPUTING NETWORKS AND METHODS OF USE THEREOF

(71) Applicant: Capital One Services, LLC, McLean, VA (US)

(72) Inventors: Lukiih Cuan, Washington, DC (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,660

(22) Filed: Dec. 21, 2022

(65) Prior Publication Data

US 2023/0206250 A1 Jun. 29, 2023

Related U.S. Application Data

(63) Continuation of application No. 16/990,836, filed on Aug. 11, 2020, now Pat. No. 11,574,318.

(51) Int. Cl.
*G06Q 10/06* (2023.01)
*G06Q 20/20* (2012.01)
*G06Q 20/10* (2012.01)
*G06Q 30/018* (2023.01)
*G06F 7/08* (2006.01)
(Continued)

(52) U.S. Cl.
CPC .......... *G06Q 30/0185* (2013.01); *G06F 7/08* (2013.01); *G06F 9/451* (2018.02); *G06F 16/2379* (2019.01); *G06F 16/24578* (2019.01); *G06Q 10/06316* (2013.01); *G06Q 20/202* (2013.01); *G06Q 20/206* (2013.01); *G06Q 40/02* (2013.01); *H04L 63/102* (2013.01); *G06Q 50/01* (2013.01)

(58) Field of Classification Search
CPC ......... G06Q 10/06; G06Q 20/20; G06Q 20/10
USPC ...................................................... 705/7.26
See application file for complete search history.

(56) References Cited

U.S. PATENT DOCUMENTS

| | | | |
|---|---|---|---|
| 11,574,318 B2* | 2/2023 | Cuan | G06Q 20/202 |
| 2008/0270171 A1* | 10/2008 | Price | G06Q 10/06 |
| | | | 705/1.1 |

(Continued)

*Primary Examiner* — Nga B Nguyen
(74) *Attorney, Agent, or Firm* — Greenberg Traurig, LLP

(57) ABSTRACT

A method includes displaying on a graphic user interface (GUI) of a computing device of a user, a log of computing operations performed by the user at computing terminals of entity servers respectively managed by entities. The user uses a unique authorization identifier provided by the authorizing entity to authorize the computing operations at the computing terminals of the entity servers. The user provides a fraud indication through the GUI that at least one computing operation in the log is fraudulent. Memory-jogging visual units are displayed on the GUI to the user that cause the user to recall performing the at least one computing operation identified as being fraudulent. An entry of the at least one computing operation in an operation database is marked as a valid operation authorized by the user when receiving a recognition indication and potentially fraudulent when no recognition indication by the user.

20 Claims, 10 Drawing Sheets

(51) Int. Cl.
*G06F 16/23* (2019.01)
*G06Q 10/0631* (2023.01)
*G06Q 40/02* (2023.01)
*G06F 9/451* (2018.01)
*H04L 9/40* (2022.01)
*G06F 16/2457* (2019.01)
*G06Q 50/00* (2012.01)

(56) References Cited

U.S. PATENT DOCUMENTS

| | | | |
|---|---|---|---|
| 2011/0055074 A1* | 3/2011 | Chen | G06Q 20/10 |
| | | | 705/39 |
| 2019/0073641 A1* | 3/2019 | Utke | G06V 20/00 |
| 2020/0273560 A1* | 8/2020 | Wolf | G16H 70/20 |
| 2021/0081948 A1* | 3/2021 | Kala | G06Q 20/4016 |
| 2021/0383391 A1* | 12/2021 | Barry | H04L 67/306 |

* cited by examiner

150

35

FRAUD CHECK

User: MSMITH565 — 152

Period: JAN. 1 – 15, 2020 — 154

LIST OF OPERATIONS — 160

| OPID | DESCRIPTION | |
|---|---|---|
| 1 | LOGIN 01052020:10:31:37   TERMINAL ID: COMPQUICK154 LOCATION: STL013: ENTITY: XYZ INC. | |
| 2 | ACCESS FILENAME CYBERKEYXY67-5.xls XYZ, INC            LOCATION: NYC001 | FROM USER: JLCOPLEY 01052020: 10:35:17 |
| 3 | STORE UPDATED CYBERKEYXY67-5.xls AT 01052020: 11:05:48 | IN C:/USER/JLCOPLEY |
| 4 | LOGOUT TERMINAL ID: COMPQUICK154: 01052020: 11:10:57 | LOCATION STL013 |

161, 162, 163, 164

170 — DID YOU PERFORM ALL OPERATIONS     NO ⬇ — 171
                                         YES — 172

175 — DID NOT PERFORM OPID     1 ⬇ — 173
                               2
                               3
                               4

FIG. 3A

ALL OPERATIONS 1-4 ARE RECORDED AS VALID

OPERATIONS 1-4 WILL BE SENT FOR FRAUD INVESTIGATION

US 11,775,987 B2

SYSTEM FOR MANAGING FRAUDULENT COMPUTING OPERATIONS OF USERS PERFORMED IN COMPUTING NETWORKS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC. All Rights Reserved.

FIELD OF TECHNOLOGY

The present disclosure generally relates to systems for managing fraudulent computing operations of users performed in computing networks and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
  causing, by a processor of an authorizing entity server managed by an authorizing entity, to display on a graphic user interface (GUI) of a computing device of a user, a log of a plurality of computing operations performed by the user at a plurality of computing terminals of a plurality of entity servers respectively managed by a plurality of entities;
  wherein the computing device, the authorizing entity server, and the plurality of entity servers may communicate over a communication network;
  wherein the plurality of computing operations may be authorized to be performed by the user at the plurality of computing terminals when the user uses a unique authorization identifier provided by the authorizing entity server;
  receiving, by the processor, from the computing device over the communication network, a fraud indication from the user through the GUI that at least one computing operation in the log is fraudulent;
  identifying, by the processor, in at least one database hosted by at least one secondary server communicating over the communication network, a plurality of visual units related to at least one entity associated with the at least one computing operation associated with the fraud indication;
  generating, by the processor, a plurality of memory-jogging visual units from the plurality of visual units that are displayed to the user on the GUI so as to allow the user to recall whether the user performed the at least one computing operation that the user identified as being fraudulent;
  wherein each memory-jogging visual unit may include metadata corresponding, in part, to the at least one computing operation associated with the fraud indication;
  ranking, by the processor, the plurality of memory-jogging visual units for displaying to the user in an order based on at least one attribute of the metadata of each memory-jogging visual unit;
  wherein the at least one attribute of the metadata may include at least one of:
    (i) a computing terminal location where any of the at least one computing operation was performed, or
    (ii) a name of the at least one entity associated with any of the at least one computing operation;
  causing, by the processor over the communication network, to display to the user on the GUI on the computing device, the plurality of memory-jogging visual units based on the ranking; and
  receiving, by the processor over the communication network, a recognition indication through the GUI by the user of performing the at least one computing operation that the user previously identified as being fraudulent.

In some embodiments, the present disclosure provides an exemplary technically improved computer-based system that includes at least the following components of:
  a memory; and
  a processor of an authorizing entity server managed by an authorizing entity;
  wherein the processor, upon executing code stored in the memory, may configure the processor to:
    cause to display on a graphic user interface (GUI) of a computing device of a user, a log of a plurality of computing operations performed by the user at a plurality of computing terminals of a plurality of entity servers respectively managed by a plurality of entities;
    wherein the computing device, the authorizing entity server, and the plurality of entity servers may communicate over a communication network;
    wherein the plurality of computing operations is authorized to be performed by the user at the plurality of computing terminals when the user uses a unique authorization identifier provided by the authorizing entity server;
    receive from the computing device over the communication network, a fraud indication from the user through the GUI that at least one computing operation in the log is fraudulent;
    identify in at least one database hosted by at least one secondary server communicating over the communication network, a plurality of visual units related to at least one entity associated with the at least one computing operation associated with the fraud indication;
    generate a plurality of memory-jogging visual units from the plurality of visual units that are displayed to the user on the GUI so as to allow the user to recall whether the user performed the at least one computing operation that the user identified as being fraudulent;
    wherein each memory-jogging visual unit may include metadata corresponding, in part, to the at least one computing operation associated with the fraud indication;
    rank the plurality of memory-jogging visual units for displaying to the user in an order based on at least one attribute of the metadata of each memory-jogging visual unit;

wherein the at least one attribute of the metadata may include at least one of:
(i) a computing terminal location where any of the at least one computing operation was performed, or
(ii) a name of the at least one entity associated with any of the at least one computing operation;
cause, over the communication network, to display to the user on the GUI on the computing device, the plurality of memory-jogging visual units based on the ranking; and
receive, over the communication network, a recognition indication through the GUI by the user of performing the at least one computing operation that the user previously identified as being fraudulent.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 3A-3D depict exemplary views of a graphic user interface displayed on a computing device of a user, in accordance with one or more embodiments of the present disclosure;

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein disclose methods and systems for managing fraudulent computing operations of users performed in computing networks.

Figure 1:
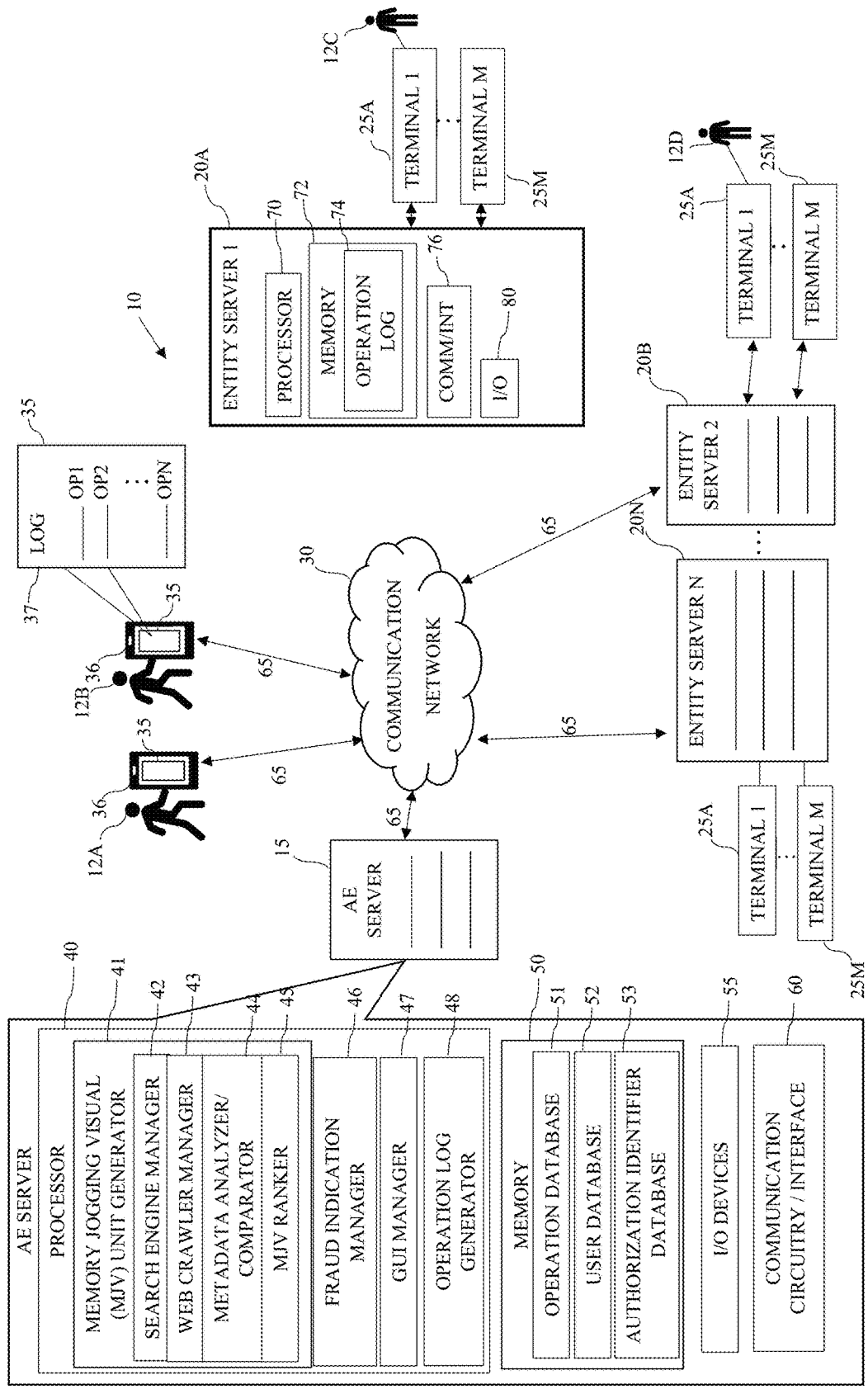
FIG. 1 depicts a first exemplary embodiment of a system for managing fraudulent computing operations of users performed in computing networks and methods of use thereof, in accordance with one or more embodiments of the present disclosure.

FIG. 1 depicts a first exemplary embodiment of a system 10 for managing fraudulent computing operations of users performed in computing networks, in accordance with one or more embodiments of the present disclosure. System 10 may include an authorizing entity (AE) server 15, a plurality of entity servers 20A, 20B, . . . 20N where N is an integer, all communicating 65 over a communication network 30. Each of the plurality of entity servers (ES) 20A, 20B, . . . 20N may include a respective plurality of computing terminals 25A, 25B, . . . 25M where M is an integer.

In some embodiments, system 10 may include users 12C and 12D, for example, performing computing operations on computing terminals 25A . . . 25M coupled to the plurality of entity servers. Each of the plurality of computing operations on any of the computing terminals may be authorized to be performed at the plurality of computing terminals when the user uses a unique authorizing identifier provided by an authorizing entity.

An entity as described herein may be a person, partnership, organization, business, and/or company, for example. An authorizing entity may be an entity that may provide the user with a unique authorization identifier, that allows the user to authorize computing operations on computing terminals 25A . . . 25M coupled to the plurality of entity servers by using the unique authorization identifier. In some embodiments, the authorizing entity may be one of the plurality of entities, or it may be a separate entity.

In some embodiments, AE server 15 may include a processor 40, a memory 50, input/output (I/O) devices 55, and communication circuitry/interface 60 for communicating 65 over communication network 30 with the plurality of computing devices 35 and/or the plurality of entity servers 20. Similarly, in some embodiments, each of the plurality of entity servers 20 may include a processor 70, a memory 72 storing an operation log and/or database 74, input/output (I/O) devices 80, and communication circuitry/interface 76 for communicating 65 over communication network 30 with the plurality of computing devices 36 and/or AE server 15. In other embodiments, each of the plurality of computing devices 36 may include (not shown) a processor, a memory, a display for displaying GUI 35, input/output (I/O) devices, and communication circuitry/interface for communicating 65 over communication network 30. Operation log and/or database 74 may include a database of all computing operations performed on computing terminals 25 coupled to entity server 20.

In some embodiments, processor 40 may be configured to execute code stored in memory 50 such as a fraud indication manager 46, a graphic user interface manager (GUI) 47, an operation log generator 48, and memory jogging visual (MJV) unit generator 41, which is referred to hereinbelow as MJV generator 41. MJV generator 41 may include a search engine manager 42, a web crawler manager 43, a metadata analyzer/comparator 44 and an MJV ranker 45.

In some embodiments, memory 50 may store an operation database 51 that may include computing operation information for the plurality of computing operations authorized using unique authorization identifiers issued by the authorizing entity. Memory 50 may store a user database 52 of users receiving unique authorization identifiers issued by the authorizing entity for authorizing computing operations on any terminals associated with any of the entity servers. Memory 50 may store a unique authorization identifier database 53 with all of the unique authorization identifiers issued by the authorizing entity.

In some embodiments, system 10 may include users 12A and 12B, for example, with respective computing devices 36, each computing device displaying a graphic user interface (GUI) 35 on a display to the user. Users may receive a log 37 of the computing operations on GUI 35 denoted OP1, OP2, . . . OPN, where N is an integer, from operation log generator 48 that the user performed on any of the plurality of computing terminals. In reviewing the log, the user may not recognize at least one of the computing operations and may relay a fraud indication to AE server 15 through a graphic user interface (GUI) on the user's device to fraud indication manager 46 that at least one of the computing operations displayed in log 37 may be fraudulent.

Figure 2:
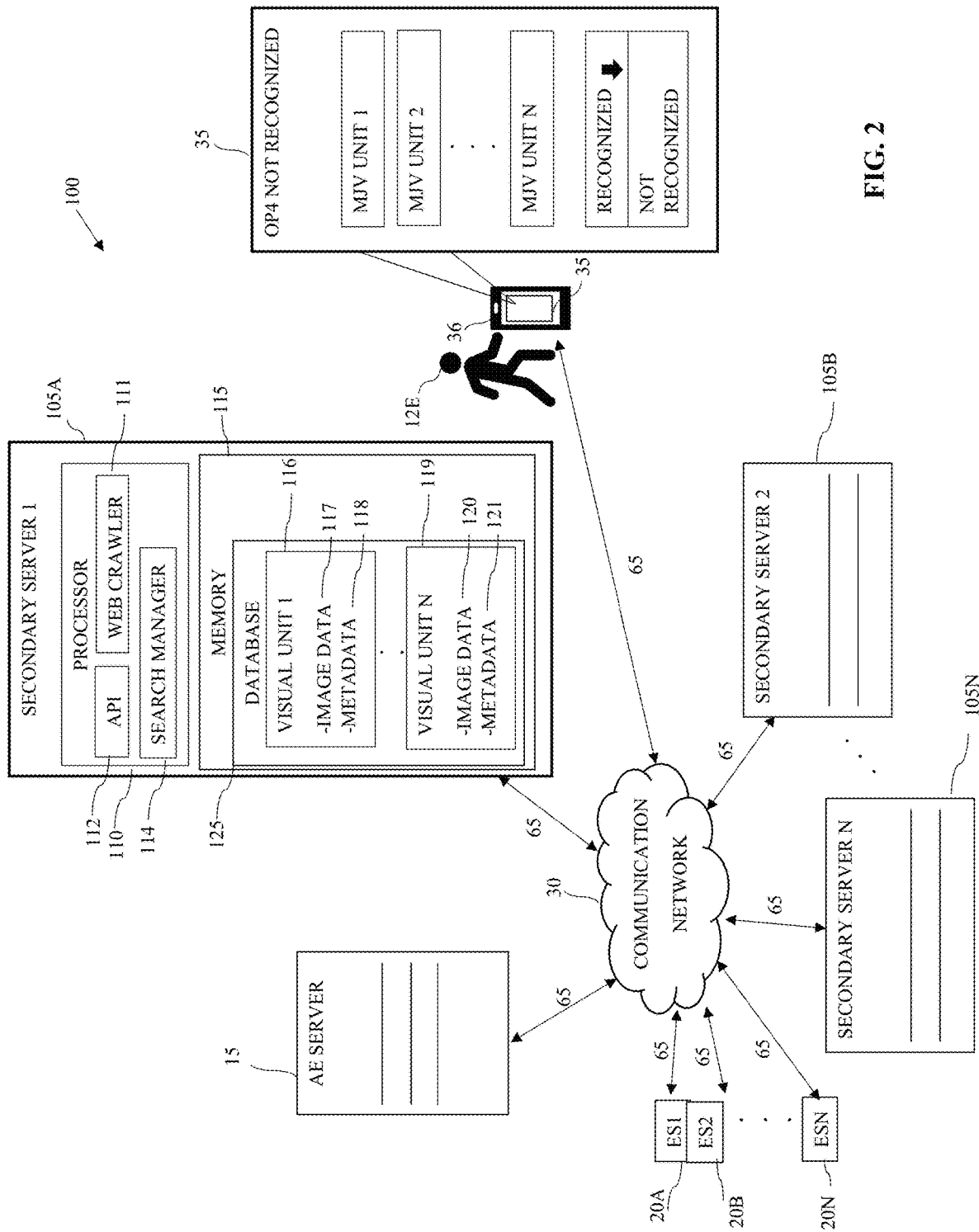
FIG. 2 depicts a second exemplary embodiment of a system for managing fraudulent computing operations of users performed in computing networks and methods of use thereof, in accordance with one or more embodiments of the present disclosure.

It is to be noted that not shown in FIG. 1 are secondary servers coupled to communication network 30. They are shown in FIG. 2. It is to be understood that the embodiments for managing fraudulent computing operations of users performed in computing networks are performed on the complete system as shown in FIG. 2.

FIG. 2 depicts a second exemplary embodiment of a system 100 for managing fraudulent computing operations of users performed in computing networks, in accordance with one or more embodiments of the present disclosure. System 100 may include the elements shown in system 10 of FIG. 1. System 100 may further include secondary servers 105A, 105B, . . . 105N where N is an integer communicating over communication network 30 with AE server 15 and/or entity servers 20A, 20B, . . . 20N. Each of the secondary servers may include a processor 110 and a memory 115.

In some embodiments, memory 115 may be used to store a database 125 that may include a plurality of N visual units such as visual units 116 and 119, where N is an integer. Visual unit 116 denoted VISUAL UNIT 1 may include metadata 118 and image data 117 for displaying the visual unit on GUI 35. Visual unit 119 denoted VISUAL UNIT N may include metadata 121 and image data 120 for displaying the visual unit on GUI 35.

In some embodiments, image data 120 in visual unit 119 may include data of an image, photograph, and/or picture. In other embodiments, the image data may include data of a video. The term visual unit may refer interchangeably to a picture, a video, or both, and/or files that may include a picture, a video, or both. A memory-jogging visual unit may refer to a visual unit that when viewed by the user causes the user to recall performing a computing operation. Metadata 121 of visual unit 119 may include description and keywords meta tags for describing content within a web page. Search engines may use this data to help understand the content within a page. Visual units 116 and 119 may have any suitable digital image format such as TIFF, JPEG, GIF, PNG, and Raw Image Files, for example. In other embodiments, visual units 116 and 119 may have any suitable digital video file format such as AVI, FLV, WMV, MP4, and MOV, for example.

In some embodiments, processor 110 may execute an application programming interface (API) 112 permitting AE server 15 to access data stored in memory 115. A web crawler 111 and a search manager 114 may facilitate the identification of images files in database 125 upon request through communication network 30 respectively from web crawler manager 43 and search engine manager 42 on AE server 15.

In some embodiments, in response to receiving a fraud indication by fraud indication manager 40, processor 40 of metadata analyzer/comparator 44 operating on AE server 15 may be configured to identify visual units 119 from at least one database 125 hosted by at least one secondary server 105 with metadata 121 related to the allegedly-fraudulent at least one computing operation. Metadata analyzer/comparator 44 may use these identified visual units 119 to generate memory-jogging visual units.

In some embodiments, the visual units may include attributes in metadata 121 related in part, for example, to the location of the computing terminal 25, and/or to the name of the entity managing entity server 20 coupled to computing terminal 25 where the allegedly-fraudulent at least one computing operation occurred. In other embodiments, MJV ranker 45 may rank the generated memory-jogging visual units for display to the user on GUI 35 in an order based on the attributes of the metadata.

As shown in GUI 35 of computing device 36 of user 12E in FIG. 2, GUI 35 may display a sequence of p memory-jogging visual units (MJV UNIT1, MJV UNIT 2, . . . MJV UNIT P) related to operation OP4 in log 37 shown in FIG. 1 after the user did not recognize operation OP4 in log 37, where p is an integer.

In some embodiments, in response to viewing the memory-jogging visual units, if the user indicates (e.g., on GUI 35 using the RECOGNIZED switch) that user recalls performing the allegedly-fraudulent at least one computing operation, an entry in the log of computing operations is marked as a valid operation. If the user still does not recognize the allegedly-fraudulent at least one computing operation (e.g., on GUI 35 using the NOT RECOGNIZED switch) in response to viewing the memory-jogging visual units, the allegedly-fraudulent at least one computing operation may be marked as potentially fraudulent and sent for further fraud investigation.

In a first exemplary embodiment as described in FIGS. 3A-3D, the entity may be a company such as a software company, any company using IT staff that is mobile between company locations, for example, or any company having multiple sites that users may perform computing operations at computing terminals at multiple sites. In this scenario, the authorizing entity may be the same company. In other embodiments, a second company may be hired to maintain computing services of the first company issuing passwords, or other personal access data as the unique authorization identifier of the user.

Figures 3B, 3C, 3D:
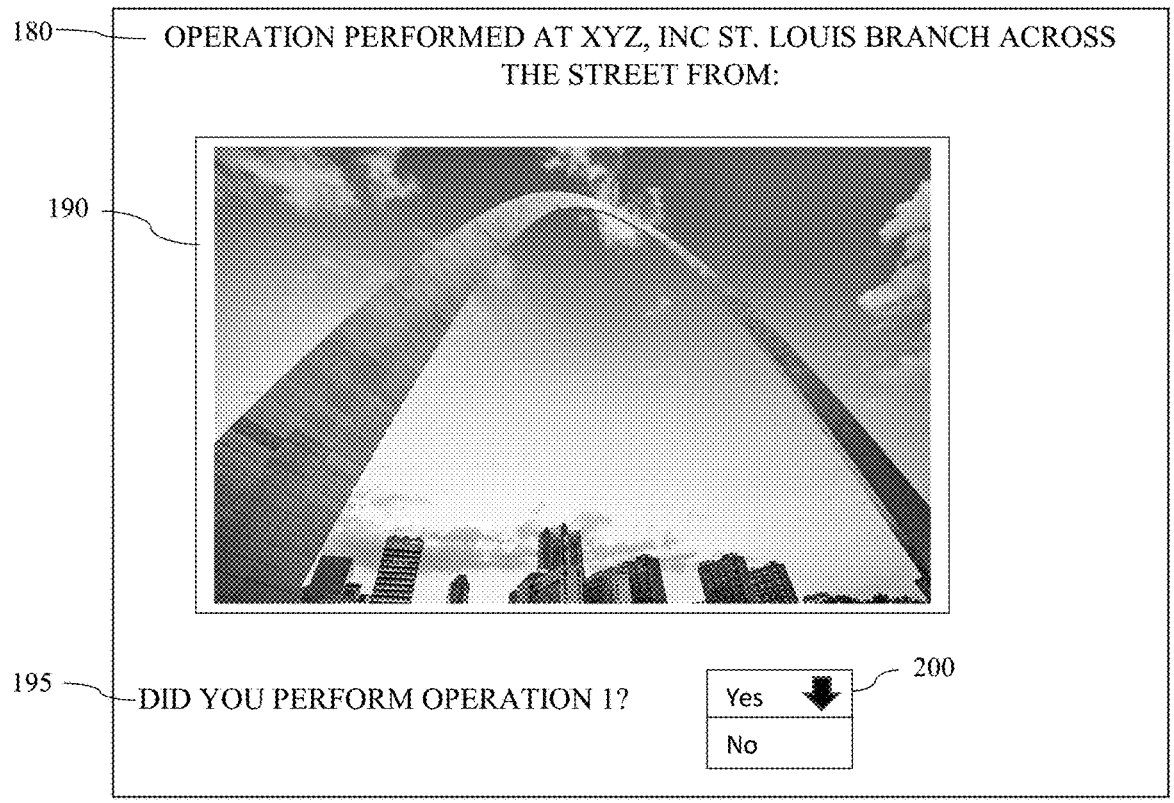

FIGS. 3A-3D depict exemplary views of graphic user interface 35 displayed on computing device 36 of user 12, in accordance with one or more embodiments of the present disclosure. In FIG. 3A, a user 152 may receive a list of operations 160 performed during a time period 154 on GUI 35. For example, an IT manager may detect and/or suspect that list of operations 160 may include possible fraudulent computing operations so operation log generator 48 may send list of operations 160 as a fraud check to user 152 (username: MSMITH565).

In some embodiments, list of operations 160 may include an operation ID (OPID) number and a description as shown in FIG. 3A. An operation 161 may identify, for example, that user 152 performed a login on a terminal with ID COMPQUICK154 at a St. Louis location (STL013) of entity XYZ, Inc. An operation 162 may identify, for example, that user 152 accessed file CYBERKEYXY67-5.xls from user JLCOPLEY. An operation 163 may identify, for example, that user 152 may have stored updated file CYBERKEYXY67-5.xls in directory C:/USER/JLCOPLEY. An operation 164 may identify, for example, that user 152 logged out from terminal with ID COMPQUICK154 at location STL013.

In some embodiments, GUI 35 may output a question 170 to user 152 asking whether user 152 performed all of the computing operation in list of operations 160. GUI 35 may include a pulldown menu to answer NO 171 or YES 172. If user 152 answers NO indicating that at least one operation in list of operations 160 may be fraudulent, a second pulldown menu may ask the user to indicate which operation OPID that user 152 did not perform. For example, the user may not recognize any of the operations and indicates 1 in pulldown menu 173 as being possibly fraudulent.

In some embodiments, fraud indication 173 of OPID 1 may be relayed from GUI 35 over communication network 30 to fraud indication manager 46 on AE server 15. In response, fraud indication manager 46 may be configured to receive allegedly-fraudulent computing operation information about the at least one allegedly-fraudulent computing operation from operation database 51 and/or operation log 74, such as the location of the computing terminal where the at least one allegedly-fraudulent computing operation was performed, the name of the entity managing the entity server of coupled to the computing terminal where the at least one allegedly-fraudulent computing operation was performed, and/or a timestamp of the allegedly-fraudulent computing operation, for example.

In some embodiments, fraud indication manager 46 may relay the allegedly-fraudulent computing operation information to memory jogging visual unit (MJV) generator 41. Fraud indication manager 46 may trigger memory jogging visual unit (MJV) generator 41 to search for visual units in at least one database hosted by at least one secondary server that have metadata related to the allegedly-fraudulent computing operation information about the at least one allegedly-fraudulent computing operation. For example, the allegedly-fraudulent computing operation information may include that the computing terminal that the at least one allegedly-fraudulent computing operation was performed at the St. Louis branch of XYZ, Inc.

In response, search engine manager 42 and/or web crawler manager 43 on AE server 15 may respectively instruct search manager 114 and/or web crawler 111 on secondary server 105 through communication network 30 to search database 125 for a plurality of visual units 119 related to the entity. In the first exemplary embodiment shown in FIG. 3A, the entity, XYZ, Inc., associated with the at least one allegedly-fraudulent computing operation that was performed at the St. Louis branch of XYZ, Inc. In this case, the secondary server may host the webpage of XYZ, Inc. The webpage may further include a visual unit of the St. Louis arch on the webpage identifying the St. Louis company branch.

Metadata analyzer/comparator 44 may use the location information from fraud indication manager 46 regarding the location of the computing terminal where the at least one allegedly-fraudulent computing operation was performed at the St. Louis branch of XYZ, Inc. Metadata analyzer/comparator 44 may compare the allegedly-fraudulent computing operation information to the metadata of the image of the St. Louis arch appearing in the St. Louis branch web page. In this example, the St. Louis branch of XYZ, Inc. is located across the street from the St. Louis Arch. MJV generator 41 may capture visual unit 119 of the St. Louis arch from the webpage of XYZ, Inc.

As shown in FIG. 3B, MJV generator 41 may then relay the St. Louis arch memory-jogging visual unit through GUI manager 47 over communication network 30 to GUI 35. GUI 35 may then display the header 180 that the "Operation Performed at XYZ, Inc. St. Louis branch across the street from:" and display memory jogging visual unit 119 of the St. Louis arch captured from the St. Louis branch webpage of XYZ, Inc. (e.g., from database 125 of secondary server 105). A second pulldown menu 200 with a question 195 "Did you perform Operation 1?"

If the user answers YES in response to seeing memory-jogging visual unit 119 of the St. Louis arch, then the at least one allegedly-fraudulent computing operation performed at the St. Louis branch of XYZ, Inc. may be recorded as a valid in operation database 51. As shown in FIG. 3C, GUI 35 may display a valid notification 205 to the user that "ALL OPERATIONS 1-4 ARE RECORDED AS VALID".

If the user answers NO in second pulldown menu 200, GUI 35 may display a fraud investigation notification 210 to the user as in FIG. 3D, that "Operations 1-4 will be sent for fraud investigation".

It should be noted that the first exemplary embodiment shown in FIGS. 3A-3D are merely for conceptual and visual clarity, and not by way of limitation of the embodiments shown herein. MJV generator 41 may capture any number of memory jogging visual units as being related to the entity, location of the computing terminal where the at least one allegedly-fraudulent computing operation was performed, that may be displayed to the user for aiding the user to recall having performed the computing operation. The memory-jogging visual units based on the location may include, but are not limited to, a picture of the entity, a street or landmark near to the entity, and/or a picture of the location where the computing terminal is located.

In some embodiments, metadata analyzer/comparator 44 of MJV generator 40 may compare at least one attribute in the metadata of each of the plurality of memory-jogging visual units found in the at least one database hosted by the at least one secondary server to the allegedly-fraudulent computing operation information from fraud indication manager 46. Metadata analyzer/comparator 44 may assign a score or some other suitable benchmark to each of the plurality of memory-jogging visual units based on the at least one attribute of the metadata in indicative of the likelihood that each of the plurality of memory-jogging visual units will cause the user to recall performing the at least one allegedly-fraudulent computing operation.

In some embodiments, MJV ranker 45 may rank the plurality of memory-jogging visual units for displaying on GUI 35 to the user in an order based on the at least one attribute of the metadata of each memory-jogging visual unit. In other embodiments, the order may be based on the ranked score or benchmark to each of the plurality of memory-jogging visual units.

In some embodiments, the at least one attribute of the metadata may include at least one of: (1) a computing terminal location where any of the at least one computing operation was performed that was identified with a fraud indication as being allegedly-fraudulent, (2) a name of the at least one entity associated with any of the least one computing operation that was identified with a fraud indication as being allegedly-fraudulent, or (3) a timestamp of computing operations identified as allegedly-fraudulent.

In some embodiments, MJV ranker 45 may rank the plurality of memory-jogging visual units for displaying to the user from a smallest timestamp difference to a largest timestamp difference between the timestamp in the metadata attributes and a timestamp in entries of an operation database associated with any of at the at least one computing operation.

In some embodiments, processor 40 may mark an entry of the allegedly-fraudulent at least one computing operation in operation database 51 as a valid operation performed by the user when receiving a recognition indication, and potentially fraudulent when no recognition indication is received.

In some embodiments, processor 40 may record in operation database 51 on authorizing entity server 15 that the plurality of memory-jogging visual units (e.g., MJV UNIT1 . . . MJV UNIT N of FIG. 2) displayed to the user on the GUI succeeded in causing the user to recall performing the at least one computing operation that the user previously identified as being fraudulent.

In some embodiments, processor 40 may store in operation database 51 on authorizing entity server 51:
  (i) the plurality of memory-jogging visual units,
  (ii) the at least one entity associated with the at least one computing operation with the fraud indication,
  (iii) an entry corresponding to the at least one computing operation with the fraud indication, and
  (iv) a number of instances that each of the plurality of memory-jogging visual units succeeded in causing users to recall performing computing operations.

In some embodiments, MJV generator 41 may generate the plurality of memory-jogging visual units by identifying, in operation database 51, memory-jogging visual units from the plurality of memory-jogging visual units where the number of instances exceeds a predefined number of successful recognition indications.

Figure 4:
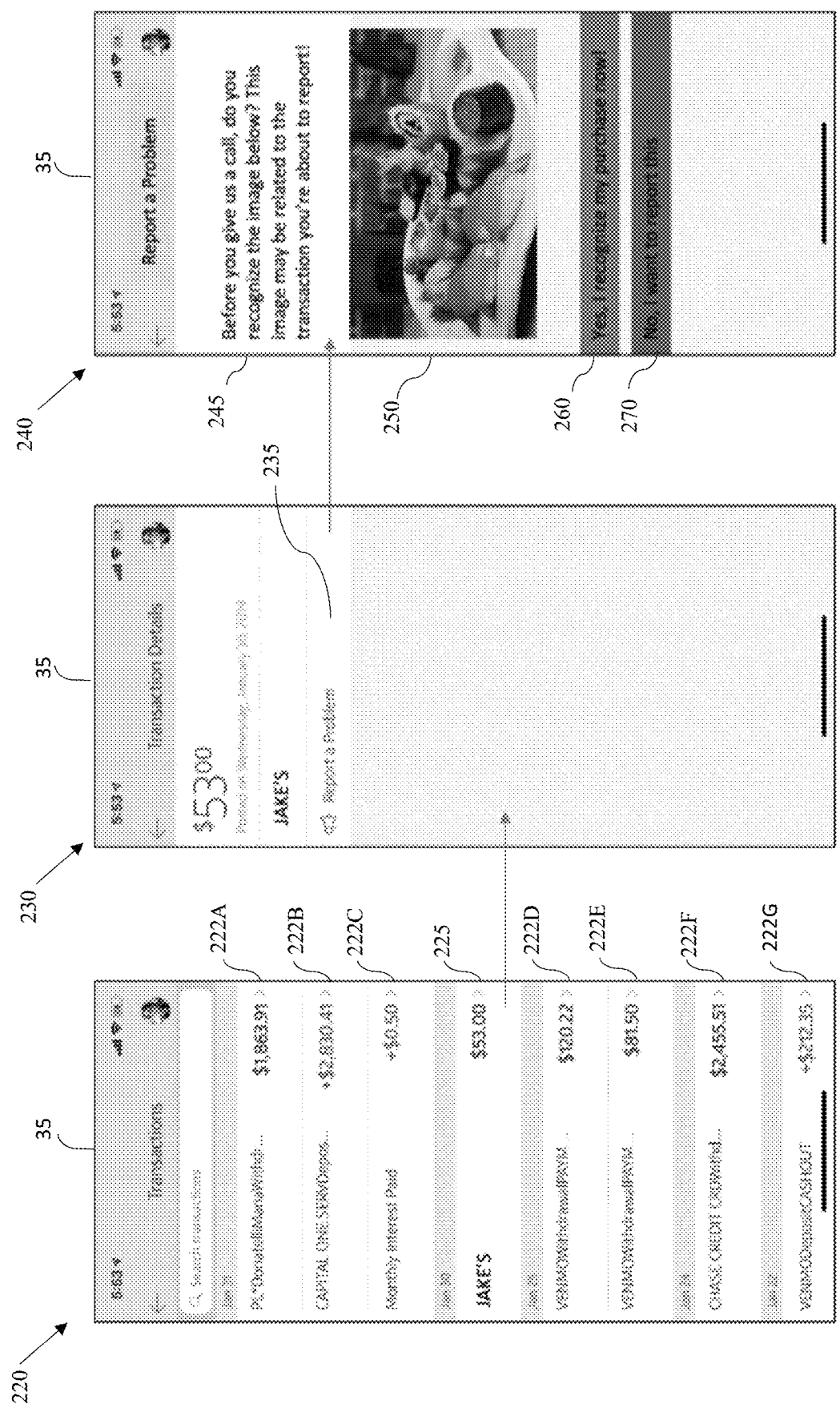
FIG. 4 depicts exemplary views of a graphic user interface displayed on a computing device of a user, in accordance with one or more embodiments of the present disclosure.

FIG. 4 depicts exemplary views of graphic user interface (GUI) 35 displayed on computing device 36 of a user, in accordance with one or more embodiments of the present disclosure. In a second exemplary embodiment as described in FIG. 4, the authorizing entity may be a financial institution issuing a payment card, debit card, and/or credit card number as the unique authorization identifier and the plurality of entities may be different merchant and/or retail stores. Log 37 of the computing operations that may be displayed to the user (such as user 12B in FIG. 1) that may include a list of operations 222A-222G and 225 performed using the user's payment card (e.g., credit card transactions), for example, as shown in a first exemplary view 220 of GUI 35. When the user looks at the list, the user may not recognize an operation 225 (e.g., Jake's).

The user may click or swipe GUI 35 on operation 225 in first exemplary view 220 of GUI 35, which causes computing device 36 to display a second exemplary view 230 on GUI 35 and displays an option 235 to "Report a Problem". When the user activates (e.g., clicks or swipes) option 235, a fraud indication is sent from computing device 36 over communication network 30 to fraud indication manager 46 in AE server 15 managed by the financial institution.

In some embodiments, fraud indication manager 46 may receive allegedly-fraudulent computing operation information about the at least one allegedly-fraudulent computing operation (e.g., operation 225—Jake's) such that Jake's is a Japanese restaurant and/or the street address of the restaurant. In other embodiments, information about Jake's restaurant may be stored alternatively in the operation database 51 of AE server 15 managed by the financial institution. In either case, the information about Jake's restaurant may be relayed to MJV generator 41. Search engine manager 42 of MJV generator 41 may search and identify on at least one database 125 hosted by at least one secondary server 105, pictures of dishes from an online menu of Jake's restaurant, for example, based on metadata attributes of visual units of Jake's menu dishes.

In some embodiments, MJV generator 41 may pull or download, for example, the plurality of memory-jogging visual units from the at least one database of the at least one secondary server. In this case, the plurality of memory-jogging visual units may include an image of Jake's restaurant, a street view of Jake's restaurant, pictures of the interior of the Japanese restaurant, in addition to the menu dish images as described above. MJV ranker 45 using historical data, for example, may assess based on the at least one attribute of the metadata that a picture of a sushi/sashimi menu dish has the highest likelihood of causing the user to recall performing the operation at the computing terminal at Jake's using a credit card issued by the financial institution (e.g., authorizing entity).

In some embodiments, GUI manager 47 through communication network 30 may cause GUI 35 to display a third exemplary view 240 on GUI 35 with a request 245 "Before you give us a call, do you recognize the image below? This image may be related to the transaction you are about to report!" GUI 35 may display a memory-jogging visual unit 250 of the sushi/sashimi menu dish. In response to viewing memory-jogging visual unit 250, the user may then recall have been at Jake's restaurant. In that case, the user may click or swipe on a recognition notification 260 on GUI 35 "Yes, I recognize my purchase now!" In other embodiments, the user may click or swipe on a fraud notification 270 on GUI 35 "No, I want to report this".

In some embodiments, in response to receiving recognition notification 260 that the user recognizes the allegedly-fraudulent at least one computing operation (e.g., credit card transaction) in response to viewing memory-jogging visual unit 250, fraud indication manager 46 may update the operation database 51 that the allegedly-fraudulent at least one computing operation is valid.

In some embodiments, in response to receiving fraud notification 270 on GUI 35 that user still does not recognize the allegedly-fraudulent at least one computing operation in response to viewing memory-jogging visual unit 250, the allegedly-fraudulent credit card transaction may be marked potentially fraudulent and sent for further fraud investigation.

In some embodiments, the allegedly-fraudulent at least one computing operation may include a business entity such as "Marty's Meat Market", for example, that may have business information stored in databases 125 on secondary servers hosting standard social media sites such as Yelp, Google, and/or Instagram. MJV generator 41 may search the metadata of images stored on those sites to generate memory-jogging visual units.

In some embodiments, the allegedly-fraudulent at least one computing operation may include an old name of the entity causing the user not to recognize the transaction with the old name when displayed in the log. For example, a user goes into Taco Bell at 123 Fifth Avenue to order a taco. However, the transaction recorded in the log of operations, such as a credit card statement, may be show the transaction as XYZ Coffee Shop at 123 Fifth Avenue.

In some embodiments, when the user triggers a fraud indication on GUI 35, fraud indication manager 46 may use the location of the computing terminal, such as a point-of-sale (POS) terminal, at the address of 123 Fifth Avenue to query databases such as Google Maps, for example, hosted by secondary servers to search for recent memory-jogging visual units with metadata related to 123 Fifth Avenue.

In some embodiments, fraud indication manager 46 may send this location information attribute over communication network 30 to search engine manager 42 and/or web crawler manager 43 on secondary servers 105 to search for at least one attribute of metadata associated with 123 Fifth Avenue on at least one database 125 hosted on at least one secondary server 105 for memory-jogging visual units. For example, search engine manager 114 and/or web crawler manager 111 on secondary server 105 may identify attributes of metadata of Google map visual units associated with 123 Fifth Avenue as the current Taco Bell.

In some embodiments, processor 110 may send a plurality of visual units over communication network 30 to MJV generator 41 related to 123 Fifth Avenue. Metadata Analyzer and Comparator 44 may compare the metadata in the Google map visual unit metadata to the allegedly-fraudulent computing operation information. Metadata Analyzer and Comparator 44 may assign as score to the visual unit with a building façade of Taco Bell at 123 Fifth Avenue from the Google map database indicative of the highest likelihood that this Taco bell façade memory-jogging visual unit will cause the user to recall performing the at least one allegedly-fraudulent computing operation, or allegedly-fraudulent credit card transaction. This Taco Bell memory-jogging visual unit may be presented to the user on GUI 35.

In some embodiments, fraud indication manager 46 may use the location of the computing terminal, such as a point-of-sale (POS) terminal, when the credit card transaction may be identified with an incomplete name, such as a GrubHub ID, for example, and the address of the business entity may be used to search for the complete-current name of the business entity. Fraud indication manager 46 may send the GrubHub ID over communication network 30 to search engine manager 42 and/or web crawler manager 43 on secondary server 105 hosting GrubHub, for example, to search for memory-jogging visual units with metadata attributes associated that GrubHub ID. The GrubHub database may provide many memory-jogging visual units of the business entity associated with that GrubHub ID that may be scored by Metadata Analyzer/Comparator 44 and may be ranked by MJV ranker 45 to determine an order to display the memory-jogging visual units to the user.

In some embodiments, where the business entity may be a restaurant, for example, the memory-jogging visual units pulled from different databases may include a façade of the restaurant, a picture of a food from the restaurant, and/or a copy of the menu, for example.

In some embodiments, when the allegedly-fraudulent at least one computing operation, such as an allegedly-fraudulent credit card transaction is made inside a merchant's establishment, the memory-jogging visual unit may include an image of the interior of the merchant's establishment.

In some embodiments, when the allegedly-fraudulent at least one computing operation, such as an allegedly-fraudulent credit card transaction is made online, the memory-jogging visual unit may include a screenshot of the website or a logo of the online company.

In some embodiments, when the allegedly-fraudulent at least one computing operation, such as an allegedly-fraudulent credit card transaction for the purchase of goods and/or services of a particular value, the memory-jogging visual unit displayed to the user may reflect the particular value. For example, if a user does not recognize a charge for $12 at Best Buy, MJV generator 41 may cause a number of memory-jogging visual units of products at Best Buy to be displayed on the user's computing device. However, MJV generator 41 will not generate images of flat screen televisions or a washing machine if the unrecognized transaction value is $12, for example. Instead the user may see images of DVDs, or USB cables, for example.

In some embodiments, MJV generator 41 may obtain images from business entities that may have their own social media presence, for example, and regularly post images onto their site. For example, there may be a Facebook page of "Board Game Café" that regularly posts pictures of board game tournaments that the Board Game Café sponsors, for example, to attract customers. The user may not recognize a credit card transaction charged from the Board Game Café. MJV generator 41 may pull images from the social media site of the business entity that are timestamped substantially close in time to the time and/or date of the allegedly-fraudulent transaction from the Board Game Café. These may be displayed to the user as memory-jogging visual units that may cause the user to recall participating in a board game tournament, for example.

In some embodiments, MJV generator 41 may be configured to consider privacy rules, requirements, and/or laws and to satisfy those privacy constraints before pulling images from database 125. Privacy rules may consider age, race, gender, for example. Privacy rules may consider facial recognition issues when applying facial detection algorithms, for example, when an image to show the user may include multiple faces in the image. Each person in the image to be displayed may not have given permission to use his/her facial image. Accordingly, in other embodiments, MJV generator 41 may be configured to blur and/or black out facial images, for example. In yet some embodiments, MJV generator 41 may call an API for pull images from a third-party database, such as database 125 only when API agreements and/or permission was obtained to crawl a particular website.

In some embodiments, MJV generator 41 may be configured to use natural language processing on social media websites hosted by secondary server 105 and images posted thereon to parse out metadata information about the different posted images. In other embodiments, natural language processing may be used to determine positive or negative sentiments from posted comments regarding the images themselves or regarding the restaurant found on a website of a particular business entity to assess relevancy as to whether the image may be useful as a memory-jogging visual unit. For example, there may be an image with a caption "we had a sweet private party on Thursday" at a particular restaurant. However, the party took place three hours after the timestamp of the transaction, so the image is not relevant.

In some embodiments, there may be two processes in which MJV generator 41 may acquire memory-jogging visual units. One process may be to generate the memory-jogging visual units on demand. For example, the user may click "Report a problem" triggering a possible fraudulent transaction. However, MJV generator 41 may query different databases for images with metadata attributes matching the information of the allegedly-fraudulent transaction. The downside of this first process may be the processing delay to pull the memory-jogging visual units. Moreover, processor 40 may use excessive computational power to acquire the memory-jogging visual units.

In some embodiments, MJV generator 41 may fetch and store a plurality of memory-jogging visual units for many of the different business entities or merchants that the authorizing entity (e.g., the financial institution) may provide with credit, debit, or payment card services, for example. This process generates a very large database of memory-jogging visual units particularly for previous fraud indications where the same wrong business name or partial name may be supplied to the user as previously described. In some embodiments, each of the stored memory-jogging visual units for each of the business entities or merchants may be updated at predefined time intervals such as every week or month, for example, in background processes performed by processor 40.

In some embodiments, metadata analyzer/comparator 44 and/or MJV ranker 45 may assign a score based on the likelihood of a particular memory-jogging visual unit for a particular merchant in previous transactions based on historical success in causing previous users to recall performing the transaction.

In some embodiments, MJV generator 41 may identify multiple images to show to the user. For example, when search engine manager 42 may search by an address, there may be one memory-jogging visual unit of the business entity building façade to display to the user. However, in the case of a GrubHub code, GrubHub may return multiple images for a particular merchant. Searching Yelp, for example, with a particular name of a business entity may result in multiple memory jogging visual units.

MJV generator 41 may apply different algorithms for determining the order for displaying the memory-jogging visual units to the user. For example, metadata analyzer/comparator 44 and/or MJV ranker 45 may query social media sites about the particular business entity regarding feedback or comments related to the usefulness of visual units of a particular business entity. Merchant codes may be used to filter acquired visual units about a business entity or merchant from social media. For example, a restaurant merchant code may cause MJV generator 41 to filter all image that are not pictures of food. The filtered memory-jogging visual units from social media related to the business entity or merchant may be stored. Metadata attributes and/or features may be extracted from the social media visual units.

In some embodiments, MJV generator 41 may apply optical character recognition (OCR) to text appearing in a visual unit on database 125, for example, for extracting information about the image. Metadata analyzer/comparator 44 may determine if the text is related to the entity and/or location of the computing terminal where the allegedly-fraudulent at least one computing operation occurred for displaying the image with text to the user as a memory-jogging visual unit.

In some embodiments, metadata analyzer/comparator 44 and/or MJV ranker 45 may apply a recency and/or a frequency factor to determine which memory-jogging visual units to display to a user. For example, the most frequent and/or the most recent visual unit of a business entity or merchant may be used. Metadata analyzer/comparator 44 may filter images with metadata having image creation dates and/or upload dates onto a website, such as Yelp, within a predefined time period such as within one months, or six months, for example.

In some embodiments, MJV generator 41 may call third party application programming interfaces (APIs), such as Google, Yelp, GrubHub for example. In other embodiments, MJV generator 41 may initiate automated web crawling over communication network 30 to retrieve memory jogging visual units from database 125 on secondary server 105.

In some embodiments, MJV generator 41 may relay the merchant name into Yelp, or any other website which may publish reviews or other information about businesses, for example, with an automated script, and analyze the attributes of the metadata of the multiple images that are returned over communication network 30 to AE server 15. MJV generator 41 may choose to download any one the analyzed images.

In some embodiments, a user may call into a call center to start a fraud investigation for a transaction that the user does not recognize. In this case, the call center agent may push a set of memory-jogging visual units (e.g., from MJV generator 41), for example, to the user's phone (e.g., user computing device 36). In other embodiments, the call center agent may push a hyperlink to an SMS message with a Uniform Resource Locator (URL). The call center agent may ask the user to click on the URL and review the website that pops up. It may be enough for the user to recognize a memory-jogging webpage even if there is not one specific memory-jogging visual unit. In yet other embodiments, the URL may point to a series of images where the user is requested to scroll to the bottom of the image series on the user's computing device and then check a box that the user still wishes to initiate a dispute after not having recognized the allegedly-fraudulent transaction.

In some embodiments, the call center agent may verbally describe the memory-jogging visual unit to the user when the user is not technically savvy and may not have a cellphone, for example.

In some embodiments, secondary servers hosting sites such as Instagram and/or Yelp may be inoperable and not assessable. Furthermore, memory-jogging visual units from previous searches may not be cached. For example, if a charge to United Airlines is not recognized by the user and no visual units related to United Airlines have been cached, generic images, or generic visual units, about flying may be displayed to the user in the event that the secondary servers may be down.

In some embodiments, the at least one database 125 hosted by the at least one secondary server 105 may be selected from the group consisting of a social media database, an online marketplace database, a referral network database, a search engine database, a restaurant database, an airline database, and a map database.

Figure 5:
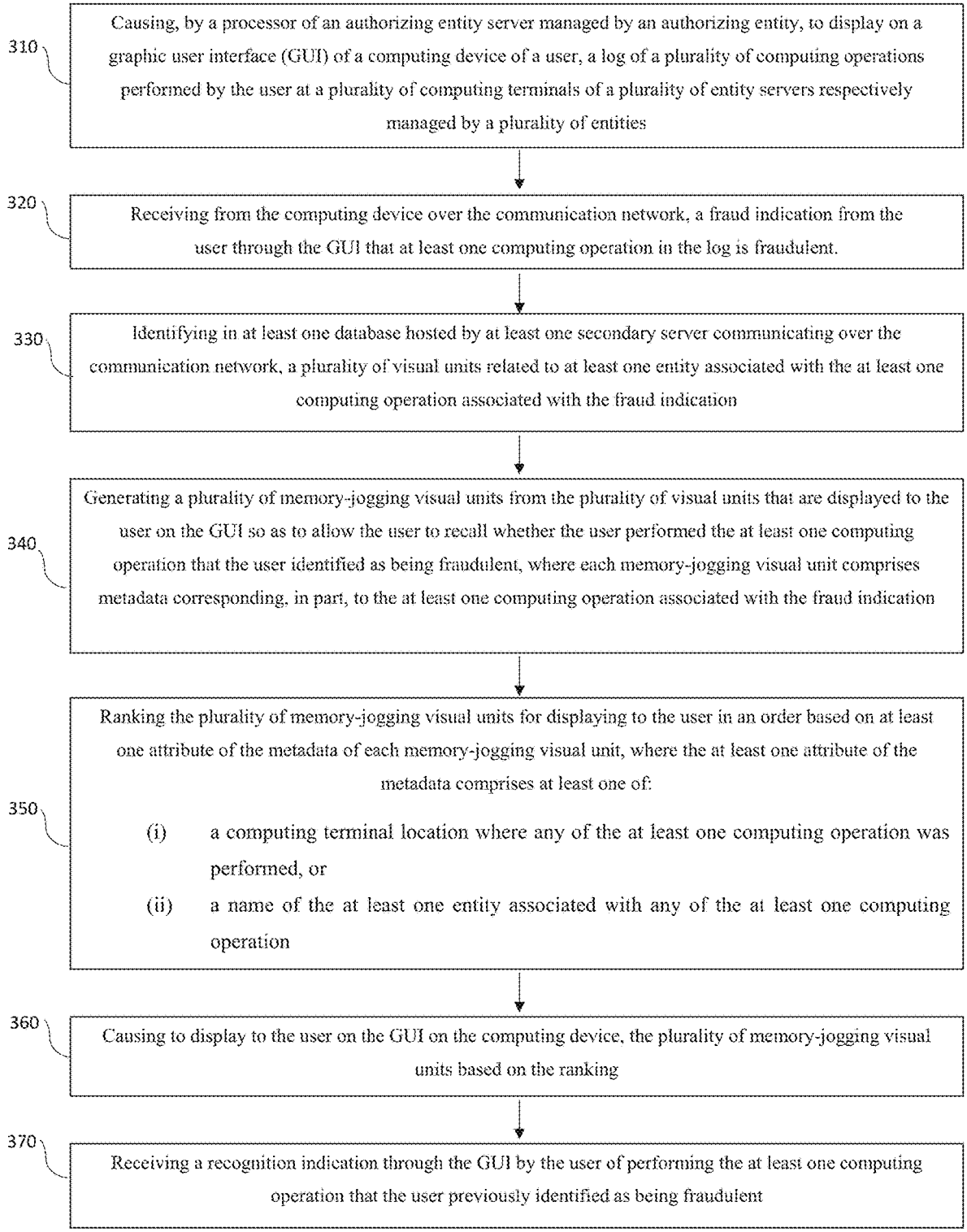
FIG. 5 illustrates a flowchart of an exemplary method for managing fraudulent computing operations of users performed in computing networks, in accordance with one or more embodiments of the present disclosure.

FIG. 5 illustrates a flowchart of an exemplary method 300 for managing fraudulent computing operations of users performed in computing networks, in accordance with one or more embodiments of the present disclosure. Method 300 may be performed by processor 40.

Method 300 may include causing 310, by processor 40 of authorizing entity (AE) server 15 managed by an authorizing entity, to display on graphic user interface (GUI) 35 of computing device 36 of user 12, a log of a plurality of computing operations performed by the user at a plurality of computing terminals 25A . . . 25M of plurality of entity servers 20A, 20B, . . . 20N respectively managed by a plurality of entities.

Method 300 may include receiving 320 from computing device 36 over communication network 30, a fraud indication from user 12 through GUI 35 that at least one computing operation in the log is fraudulent.

Method 300 may include identifying 330 in at least one database hosted by at least one secondary server communicating over the communication network, a plurality of visual units related to at least one entity associated with the at least one computing operation with the fraud indication.

Method 300 may include generating 340 a plurality of memory-jogging visual units from the plurality of visual units that are displayed to the user on the GUI so as to allow the user to recall whether the user performed the at least one computing operation that the user identified as being fraudulent, where each memory-jogging visual unit comprises metadata corresponding, in part, to the at least one computing operation associated with the fraud indication.

Method 300 may include ranking 350, by the processor, the plurality of memory-jogging visual units for displaying to the user in an order based on at least one attribute of the metadata of each memory-jogging visual unit, where the at least one attribute of the metadata comprises at least one of:
  (i) a computing terminal location where any of the at least one computing operation was performed, or
  (ii) a name of the at least one entity associated with any of the at least one computing operation.

Method 300 may include causing 360 to display to the user on the GUI on the computing device, the plurality of memory-jogging visual units based on the ranking.

Method 300 may include receiving 370 a recognition indication through the GUI by the user of performing the at least one computing operation that the user previously identified as being fraudulent such as shown in FIG. 2, pulldown menu 200 of FIG. 3B, and/or recognition notification 260 in FIG. 4.

When a user does not recall performing at least one computing operation in response to reviewing a log of a plurality of computing operations, the need to research and investigate the allegedly-fraudulent computing operation may waste a lot of time, money, and particularly computing resources for the authorizing entity and/or any of the plurality of entities to perform the fraud investigations.

The embodiments herein provide a technical solution to this problem whereby the authorizing entity server uses the computing operation information related to the computing terminal where the allegedly-fraudulent computing operation occurred. The allegedly-fraudulent computing operation information may include at least one of: (1) the location of the computing terminal coupled to an entity server, (2) the name of entity managing the entity server, or (3) a timestamp of when the allegedly-fraudulent computing operation occurred. The allegedly-fraudulent computing operation information may be used as search criteria and/or web crawling criteria to locate candidate memory-jogging visual units with metadata attributes substantially matching the allegedly-fraudulent computing operation information, where the candidate memory-jogging visual units may be located on third party databases on secondary servers. Thus, the user recognizes the allegedly-fraudulent computing operation in this pre-fraud investigation step based on the displayed memory-jogging visual units, the fraud investigation is never initiated.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99, 999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

The aforementioned examples are, of course, illustrative and not restrictive. As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
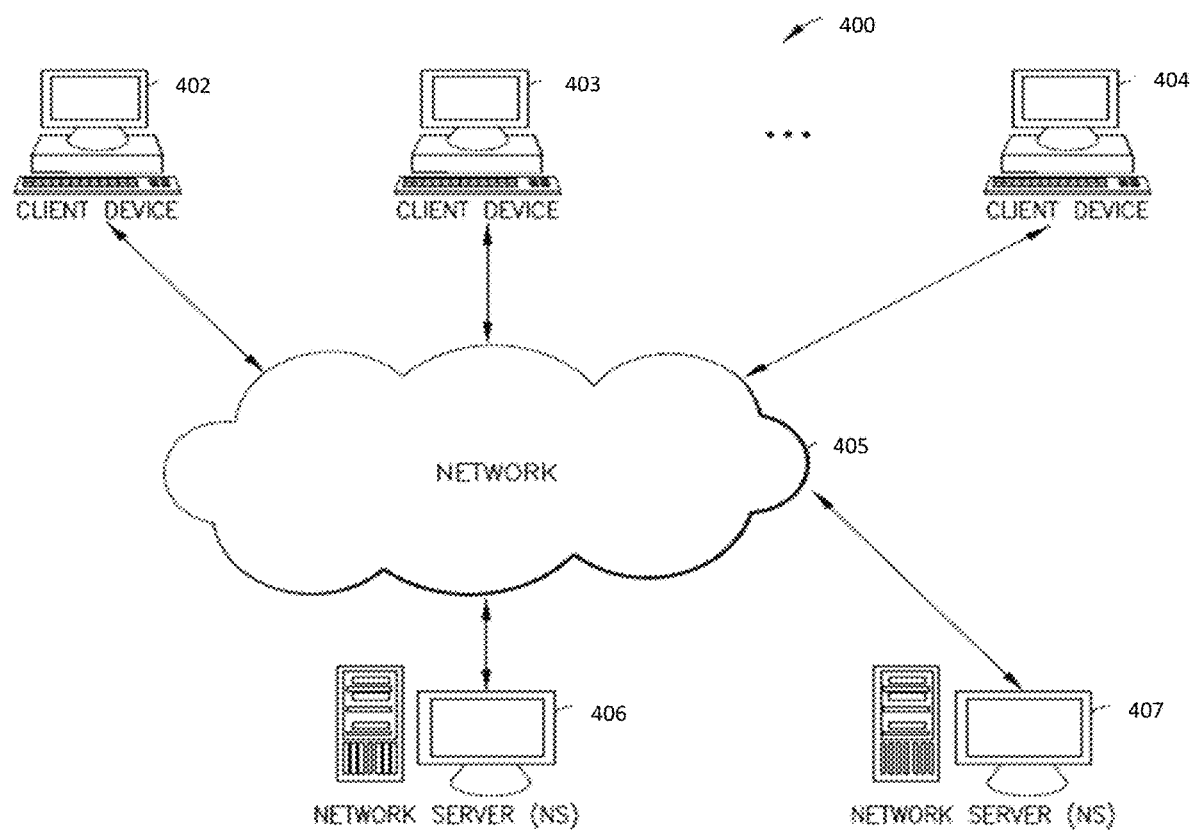
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
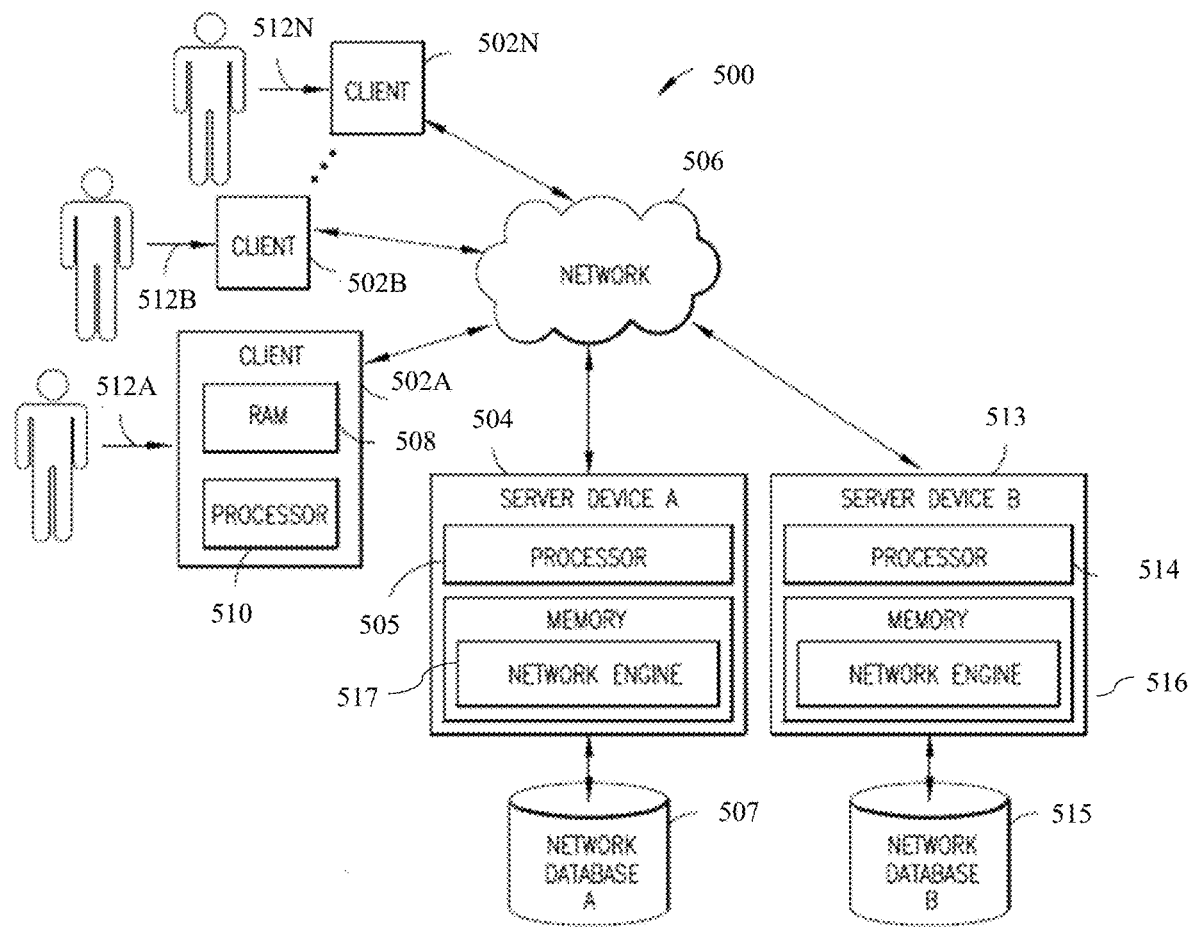
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502$a$, 502$b$ through 502$n$ shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices as in FIG. 1 with I/O devices 55 and 80. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
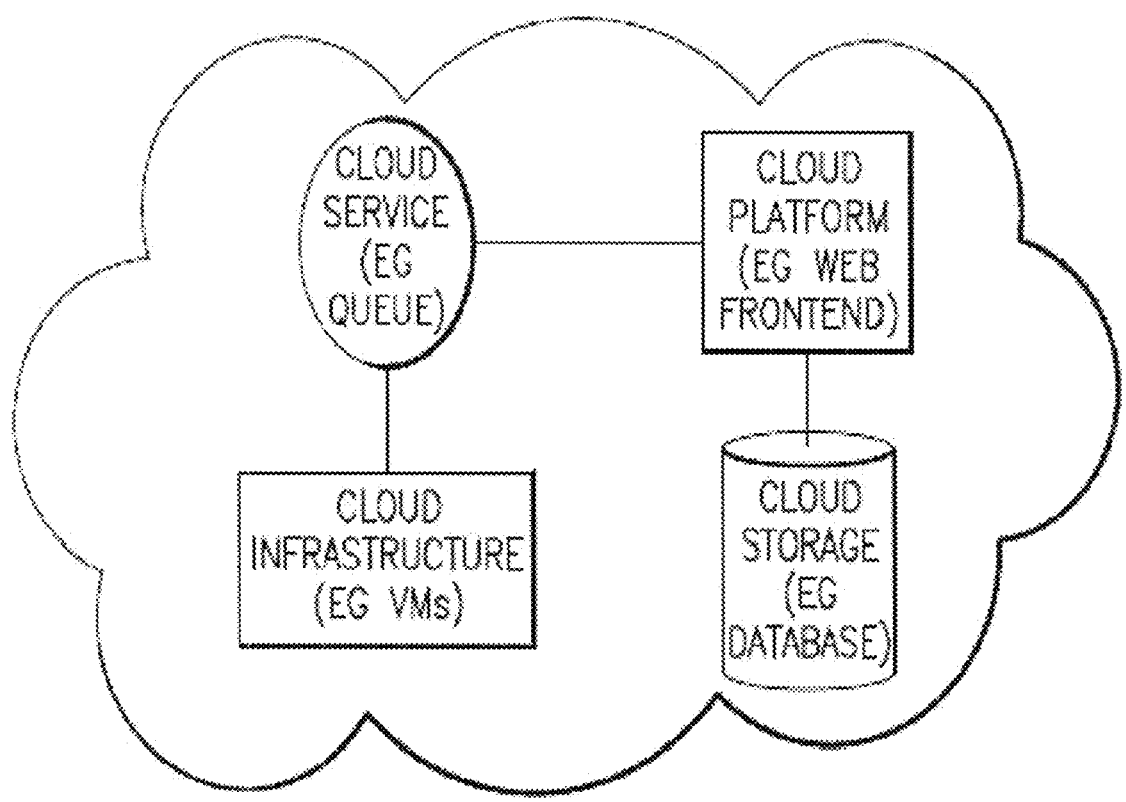
FIGS. 8 and 9 are diagrams illustrating implementations of cloud computing architecture/aspects with respect to which the disclosed technology may be specifically configured to operate, in accordance with one or more embodiments of the present disclosure.
Figure 9:
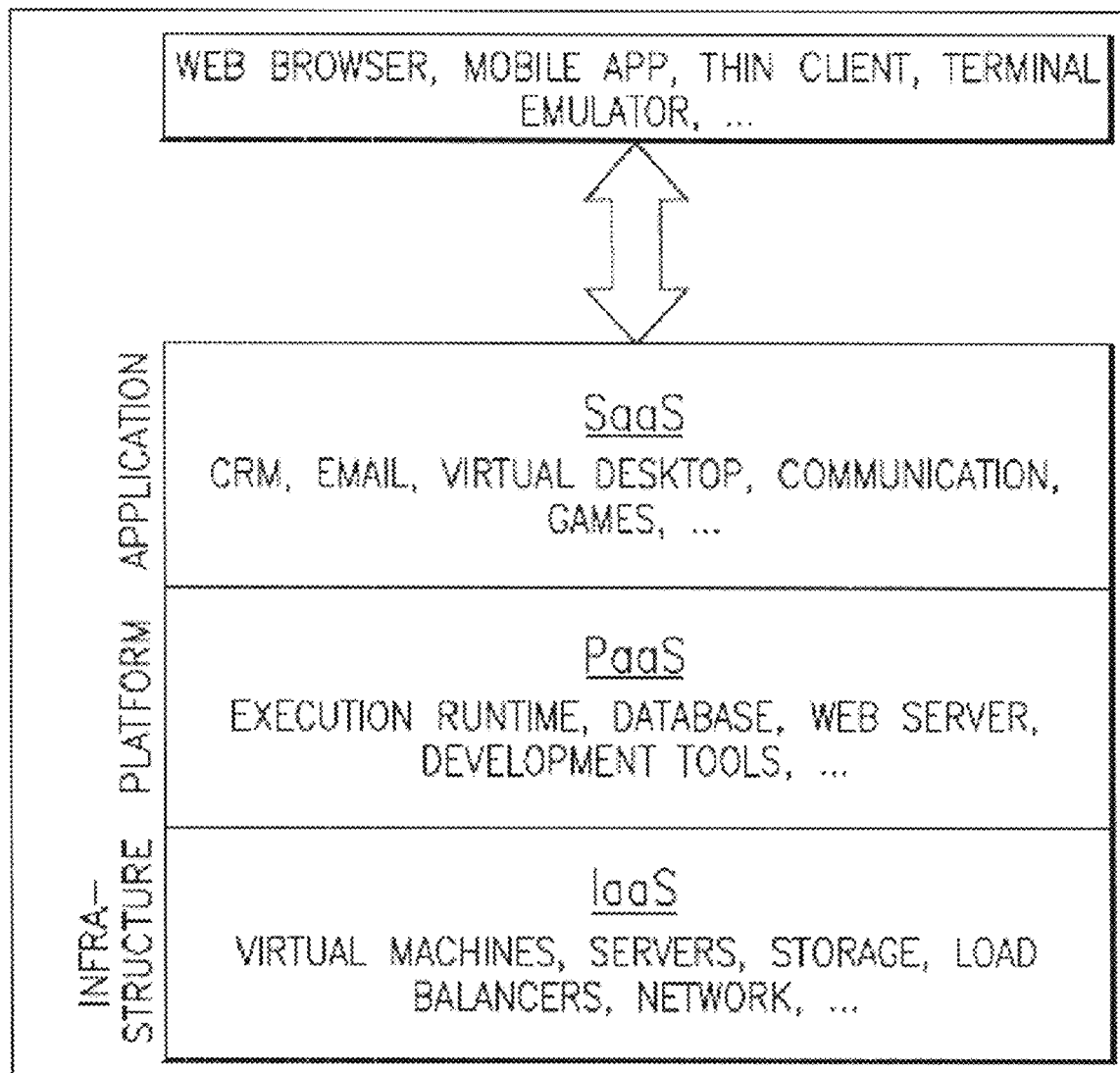

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

At least some aspects of the present disclosure will now be described with reference to the following numbered clauses.

1. A method, comprising:
   causing, by a processor of an authorizing entity server managed by an authorizing entity, to display on a graphic user interface (GUI) of a computing device of a user, a log of a plurality of computing operations performed by the user at a plurality of computing terminals of a plurality of entity servers respectively managed by a plurality of entities;
   wherein the computing device, the authorizing entity server, and the plurality of entity servers communicate over a communication network;
   wherein the plurality of computing operations is authorized to be performed by the user at the plurality of computing terminals when the user uses a unique authorization identifier provided by the authorizing entity server;
   receiving, by the processor, from the computing device over the communication network, a fraud indication from the user through the GUI that at least one computing operation in the log is fraudulent;
   identifying, by the processor, in at least one database hosted by at least one secondary server communicating over the communication network, a plurality of visual units related to at least one entity associated with the at least one computing operation associated with the fraud indication;
   generating, by the processor, a plurality of memory-jogging visual units from the plurality of visual units that are displayed to the user on the GUI so as to allow the user to recall whether the user performed the at least one computing operation that the user identified as being fraudulent;

wherein each memory-jogging visual unit comprises metadata corresponding, in part, to the at least one computing operation associated with the fraud indication;

ranking, by the processor, the plurality of memory-jogging visual units for displaying to the user in an order based on at least one attribute of the metadata of each memory-jogging visual unit;

wherein the at least one attribute of the metadata comprises at least one of:

(iii) a computing terminal location where any of the at least one computing operation was performed, or (iv) a name of the at least one entity associated with any of the at least one computing operation;

causing, by the processor over the communication network, to display to the user on the GUI on the computing device, the plurality of memory-jogging visual units based on the ranking; and receiving, by the processor over the communication network, a recognition indication through the GUI by the user of performing the at least one computing operation that the user previously identified as being fraudulent.

2. The method according to clause 1, further comprising:
marking, by the processor, an entry of the at least one computing operation in an operation database as a valid operation performed by the user when receiving the recognition indication and potentially fraudulent when no recognition indication is received.

3. The method according to clause 1, further comprising recording, by the processor, in an operation database on the authorizing entity server that the plurality of memory-jogging visual units displayed to the user on the GUI succeeded in causing the user to recall performing the at least one computing operation that the user previously identified as being fraudulent.

4. The method according to clause 1, further comprising storing, by the processor, in an operation database on the authorizing entity server:
  (i) the plurality of memory-jogging visual units,
  (ii) the at least one entity associated with the at least one computing operation with the fraud indication,
  (iii) an entry corresponding to the at least one computing operation with the fraud indication, and
  (iv) a number of instances that each of the plurality of memory-jogging visual units succeeded in causing users to recall performing computing operations.

5. The method according to clause 4, wherein generating the plurality of memory-jogging visual units comprises identifying, in an operation database, memory-jogging visual units from the plurality of memory-jogging visual units where the number of instances exceeds a predefined number of successful recognition indications.

6. The method according to clause 1, wherein the at least one attribute of the metadata comprises a timestamp.

7. The method according to clause 6, wherein ranking the plurality of memory-jogging visual units for displaying to the user comprises ranking the plurality of memory-jogging visual units from a smallest timestamp difference to a largest timestamp difference between the timestamp in the metadata and a timestamp in entries of an operation database associated with any of the at least one computing operation.

8. The method according to clause 1, wherein the plurality of computing terminals of the plurality of entity servers respectively managed by the plurality of entities comprise a plurality of point-of-sale terminals of a plurality of company servers respectively managed by a plurality of companies.

9. The method according to clause 1, wherein the authorizing entity comprises a financial institution, and wherein the unique authorization identifier comprises a payment card number associated with a payment card issued by the financial institution; and wherein the log of the plurality of computing operations performed by the user comprises a list of transactions authorized by the user using the payment card.

10. The method according to clause 1, wherein the at least one database hosted by the at least one secondary server is selected from the group consisting of a social media database, an online marketplace database, a referral network database, a search engine database, a restaurant database, an airline database, and a map database.

11. A system, comprising:
  a memory; and
  a processor of an authorizing entity server managed by an authorizing entity;
  wherein the processor, upon executing code stored in the memory, configure the processor cause to display on a graphic user interface (GUI) of a computing device of a user, a log of a plurality of computing operations performed by the user at a plurality of computing terminals of a plurality of entity servers respectively managed by a plurality of entities;
  wherein the computing device, the authorizing entity server, and the plurality of entity servers communicate over a communication network;
  wherein the plurality of computing operations is authorized to be performed by the user at the plurality of computing terminals when the user uses a unique authorization identifier provided by the authorizing entity server;
  receive from the computing device over the communication network, a fraud indication from the user through the GUI that at least one computing operation in the log is fraudulent;
  identify in at least one database hosted by at least one secondary server communicating over the communication network, a plurality of visual units related to at least one entity associated with the at least one computing operation associated with the fraud indication;
  generate a plurality of memory-jogging visual units from the plurality of visual units that are displayed to the user on the GUI so as to allow the user to recall whether the user performed the at least one computing operation that the user identified as being fraudulent;
  wherein each memory-jogging visual unit comprises metadata corresponding, in part, to the at least one computing operation associated with the fraud indication;
  rank the plurality of memory-jogging visual units for displaying to the user in an order based on at least one attribute of the metadata of each memory-jogging visual unit;
  wherein the at least one attribute of the metadata comprises at least one of:
  (iii) a computing terminal location where any of the at least one computing operation was performed, or
  (iv) a name of the at least one entity associated with any of the at least one computing operation;

cause, over the communication network, to display to the user on the GUI on the computing device, the plurality of memory-jogging visual units based on the ranking; and receive, over the communication network, a recognition indication through the GUI by the user of performing the at least one computing operation that the user previously identified as being fraudulent.

12. The system according to clause 11, wherein the processor is further configured to:
mark an entry of the at least one computing operation in an operation database as a valid operation performed by the user when receiving the recognition indication and potentially fraudulent when no recognition indication is received.

13. The system according to clause 11, wherein the processor is further configured to record in an operation database on the authorizing entity server that the plurality of memory-jogging visual units displayed to the user on the GUI succeeded in causing the user to recall performing the at least one computing operation that the user previously identified as being fraudulent.

14. The system according to clause 11, wherein the processor is further configured to store in an operation database on the authorizing entity server:
(i) the plurality of memory-jogging visual units,
(ii) the at least one entity associated with the at least one computing operation with the fraud indication,
(iii) an entry corresponding to the at least one computing operation with the fraud indication, and
(iv) a number of instances that each of the plurality of memory-jogging visual units succeeded in causing users to recall performing computing operations.

15. The system according to clause 14, wherein the processor is configured to generate the plurality of memory-jogging visual units by identifying, in an operation database, memory-jogging visual units from the plurality of memory-jogging visual units where the number of instances exceeds a predefined number of successful recognition indications.

16. The system according to clause 11, wherein the at least one attribute of the metadata comprises a timestamp.

17. The system according to clause 16, wherein the processor is configured to rank the plurality of memory-jogging visual units for displaying to the user by ranking the plurality of memory-jogging visual units from a smallest timestamp difference to a largest timestamp difference between the timestamp in the metadata and a timestamp in entries of an operation database associated with any of at the at least one computing operation.

18. The system according to clause 11, wherein the plurality of computing terminals of the plurality of entity servers respectively managed by the plurality of entities comprise a plurality of point-of-sale terminals of a plurality of company servers respectively managed by a plurality of companies.

19. The system according to clause 11, wherein the authorizing entity comprises a financial institution, and wherein the unique authorization identifier comprises a payment card number associated with a payment card issued by the financial institution; and wherein the log of the plurality of computing operations performed by the user comprises a list of transactions authorized by the user using the payment card.

20. The system according to clause 11, wherein the at least one database hosted by the at least one secondary server is selected from the group consisting of a social media database, an online marketplace database, a referral network database, a search engine database, a restaurant database, an airline database, and a map database.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by a processor of an authorizing entity server managed by an authorizing entity, over a communication network, from a computing device associated with a user, a fraud indication from the user through a graphic user interface (GUI) displayed on the computing device that at least one computing operation in a log of a plurality of computing operations performed by the user at a plurality of computing terminals is fraudulent;
wherein the plurality of computing terminals is associated with a plurality of entity servers respectively associated with a plurality of entities;
transmitting, by the processor, over the communication network, in response to the fraud indication, at least one first instruction to at least one secondary server to trigger an application programming interface (API) call;
wherein the API call programs the at least one secondary server to:
(i) identify in at least one database hosted by the at least one secondary server, a plurality of visual units related to at least one entity associated with the at least one computing operation associated with the fraud indication; and
(ii) automatically transmit the plurality of visual units to the authorizing entity server;
receiving, by the processor, over the communication network, the plurality of visual units;
generating, by the processor, a plurality of memory-jogging visual units from the plurality of visual units so that when the plurality of memory-jogging visual units is displayed to the user on the GUI, the plurality of memory-jogging visual units is configured to facilitate the user to recall whether the user performed the at least one computing operation that the user previously identified as being fraudulent;
wherein each memory-jogging visual unit comprises metadata corresponding, in part, to the at least one computing operation associated with the fraud indication;
transmitting, by the processor, over the communication network, at least one second instruction to the computing device to display to the user on the GUI, at least one memory-jogging visual unit from the plurality of memory-jogging visual units; and
receiving, by the processor, over the communication network, through the GUI and from the user, a recognition indication, identifying that the user recalled performing the at least one computing operation that the user previously identified as being fraudulent.

2. The method according to claim 1, further comprising: marking, by the processor, an entry of the at least one computing operation in an operation database as a valid operation performed by the user when receiving the recognition indication and potentially fraudulent when no recognition indication is received.

3. The method according to claim 1, further comprising recording, by the processor, in an operation database on the authorizing entity server that the plurality of memory-jogging visual units displayed to the user on the GUI succeeded in causing the user to recall performing the at least one computing operation that the user previously identified as being fraudulent.

4. The method according to claim 1, further comprising storing, by the processor, in an operation database on the authorizing entity server:
(i) the plurality of memory-jogging visual units,
(ii) the at least one entity associated with the at least one computing operation with the fraud indication,
(iii) an entry corresponding to the at least one computing operation with the fraud indication, and
(iv) a number of instances that each of the plurality of memory-jogging visual units succeeded in causing users to recall performing computing operations.

5. The method according to claim 4, wherein generating the plurality of memory-jogging visual units comprises identifying, in an operation database, memory-jogging visual units from the plurality of memory-jogging visual units where the number of instances exceeds a predefined number of successful recognition indications.

6. The method according to claim 1, wherein the plurality of memory-jogging visual units comprises:
(i) a digital image file having a digital image file format from any of: a tag image file format (TIFF), a joint photographic experts group (JPEG) format, a Graphics Interchange Format (GIF), a Portable Network graphics (PNG) format, and a raw image file format,
(ii) a digital video file having a digital video file format from any of: an audio interleave video (AVI) format, a flash video (FLV) format, a windows media video (WMV) format, a moving picture expert group-4 (MP4) format, and Apple Quicktime Movie (MOV) format, or
(iii) any combination thereof.

7. The method according to claim 1, wherein the metadata comprises a timestamp; and further comprising ranking, by the processor, the plurality of memory-jogging visual units from a smallest timestamp difference to a largest timestamp difference between the timestamp in the metadata and a timestamp in entries of an operation database associated with any of at the at least one computing operation.

8. The method according to claim 1, wherein the plurality of computing terminals of the plurality of entity servers respectively managed by the plurality of entities comprise a plurality of point-of-sale terminals of a plurality of company servers respectively managed by a plurality of companies.

9. The method according to claim 1, wherein the authorizing entity comprises a financial institution; and wherein the log of the plurality of computing operations performed by the user comprises a list of transactions authorized by the user using a payment card.

10. The method according to claim 1, wherein the at least one database hosted by the at least one secondary server is selected from the group consisting of a social media database, an online marketplace database, a referral network database, a search engine database, a restaurant database, an airline database, and a map database.

11. A system, comprising:
a memory; and
a processor of an authorizing entity server managed by an authorizing entity;
wherein the processor, upon executing code stored in the memory, is configured to:
receive over a communication network, from a computing device associated with a user, a fraud indication from the user through a graphic user interface (GUI) displayed on the computing device that at least one computing operation in a log of a plurality of computing operations performed by the user at a plurality of computing terminals is fraudulent;
wherein the plurality of computing terminals is associated with a plurality of entity servers respectively associated with a plurality of entities;
transmit over the communication network, in response to the fraud indication, at least one first instruction to at least one secondary server to trigger an application programming interface (API) call;
wherein the API call programs the at least one secondary server to:
(i) identify in at least one database hosted by the at least one secondary server, a plurality of visual units related to at least one entity associated with the at least one computing operation associated with the fraud indication; and
(ii) automatically transmit the plurality of visual units to the authorizing entity server;
receive over the communication network, the plurality of visual units;
generate a plurality of memory-jogging visual units from the plurality of visual units so that when the plurality of memory-jogging visual units is displayed to the user on the GUI, the plurality of memory-jogging visual units is configured to facilitate the user to recall whether the user performed the at least one computing operation that the user previously identified as being fraudulent;
wherein each memory-jogging visual unit comprises metadata corresponding, in part, to the at least one computing operation associated with the fraud indication;
transmit, over the communication network, at least one second instruction to the computing device to display to the user on the GUI at least one memory-jogging visual unit from the plurality of memory-jogging visual units; and
receive, over the communication network, through the GUI and from the user, a recognition indication, identifying that the user recalled performing the at least one computing operation that the user previously identified as being fraudulent.

12. The system according to claim 11, wherein the processor is further configured to mark an entry of the at least one computing operation in an operation database as a valid operation performed by the user when receiving the recognition indication and potentially fraudulent when no recognition indication is received.

13. The system according to claim 11, wherein the processor is further configured to record in an operation database on the authorizing entity server that the plurality of memory-jogging visual units displayed to the user on the GUI succeeded in causing the user to recall performing the at least one computing operation that the user previously identified as being fraudulent.

14. The system according to claim 11, wherein the processor is further configured to store in an operation database on the authorizing entity server:
- (i) the plurality of memory-jogging visual units,
- (ii) the at least one entity associated with the at least one computing operation with the fraud indication,
- (iii) an entry corresponding to the at least one computing operation with the fraud indication, and
- (iv) a number of instances that each of the plurality of memory-jogging visual units succeeded in causing users to recall performing computing operations.

15. The system according to claim 14, wherein the processor is configured to generate the plurality of memory-jogging visual units by identifying, in an operation database, memory-jogging visual units from the plurality of memory-jogging visual units where the number of instances exceeds a predefined number of successful recognition indications.

16. The system according to claim 11, wherein the plurality of memory-jogging visual units comprises:
- (iv) a digital image file having a digital image file format from any of: a tag image file format (TIFF), a joint photographic experts group (JPEG) format, a Graphics Interchange Format (GIF), a Portable Network graphics (PNG) format, and a raw image file format,
- (v) a digital video file having a digital video file format from any of: an audio interleave video (AVI) format, a flash video (FLV) format, a windows media video (WMV) format, a moving picture expert group-4 (MP4) format, and Apple Quicktime Movie (MOV) format, or
- (vi) any combination thereof.

17. The system according to claim 11, wherein the processor is configured to rank the plurality of memory-jogging visual units from a smallest timestamp difference to a largest timestamp difference between the timestamp in the metadata and a timestamp in entries of an operation database associated with any of at the at least one computing operation.

18. The system according to claim 11, wherein the plurality of computing terminals of the plurality of entity servers respectively managed by the plurality of entities comprise a plurality of point-of-sale terminals of a plurality of company servers respectively managed by a plurality of companies.

19. The system according to claim 11, wherein the authorizing entity comprises a financial institution; and wherein the log of the plurality of computing operations performed by the user comprises a list of transactions authorized by the user using a payment card.

20. The system according to claim 11, wherein the at least one database hosted by the at least one secondary server is selected from the group consisting of a social media database, an online marketplace database, a referral network database, a search engine database, a restaurant database, an airline database, and a map database.

* * * * *